US008957851B2

(12) United States Patent
Fukano

(10) Patent No.: US 8,957,851 B2
(45) Date of Patent: Feb. 17, 2015

(54) PROJECTION APPARATUS, PROJECTION CONTROL METHOD AND STORAGE MEDIUM STORING PROGRAM

(75) Inventor: Kazuyasu Fukano, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 170 days.

(21) Appl. No.: 13/615,496

(22) Filed: Sep. 13, 2012

(65) Prior Publication Data

US 2013/0076620 A1   Mar. 28, 2013

(30) Foreign Application Priority Data

Sep. 22, 2011   (JP) ................................. 2011-207566

(51) Int. Cl.
| G09G 5/00 | (2006.01) |
| G03B 21/14 | (2006.01) |
| G06F 3/01 | (2006.01) |
| H04N 9/31 | (2006.01) |
| G03B 21/20 | (2006.01) |

(52) U.S. Cl.
CPC  *G03B 21/14* (2013.01); *G06F 3/01* (2013.01); *H04N 9/3179* (2013.01); *H04N 9/3194* (2013.01); *G03B 21/2033* (2013.01)
USPC ......................................................... 345/156

(58) Field of Classification Search
USPC ................................................. 345/156–172
See application file for complete search history.

(56) References Cited

U.S. PATENT DOCUMENTS

| 7,259,747 | B2 | 8/2007 | Bell |
| 7,834,846 | B1 | 11/2010 | Bell |
| 2009/0103780 | A1 | 4/2009 | Nishihara et al. |
| 2009/0115721 | A1* | 5/2009 | Aull et al. ..................... 345/156 |
| 2009/0231468 | A1 | 9/2009 | Yasuda |

FOREIGN PATENT DOCUMENTS

| CN | 1582567 A | 2/2005 |
| CN | 101534396 A | 9/2009 |
| CN | 201468708 U | 5/2010 |
| JP | 2005-141151 A | 6/2005 |

OTHER PUBLICATIONS

Chinese Office Action dated Jul. 28, 2014, issued in counterpart Chinese Application No. 201210402322.X.

* cited by examiner

*Primary Examiner* — Premal Patel
(74) *Attorney, Agent, or Firm* — Holtz, Holtz, Goodman & Chick PC

(57) ABSTRACT

A projector apparatus includes a light source, a projection unit to form an optical image by using the light source and to project the formed image, an input unit to input a video signal representing the image, a person detection unit to detect a person existing in a projection area, a first projection control unit to set the projector apparatus to a projection state using a preset illumination pattern, when a person has been detected in the projection area, a motion analyzing unit to analyze a person's motion in the projection area, and a second projection control unit to activate the motion analyzing unit, after setting the projector apparatus to the projection state using the preset illumination pattern.

10 Claims, 2 Drawing Sheets

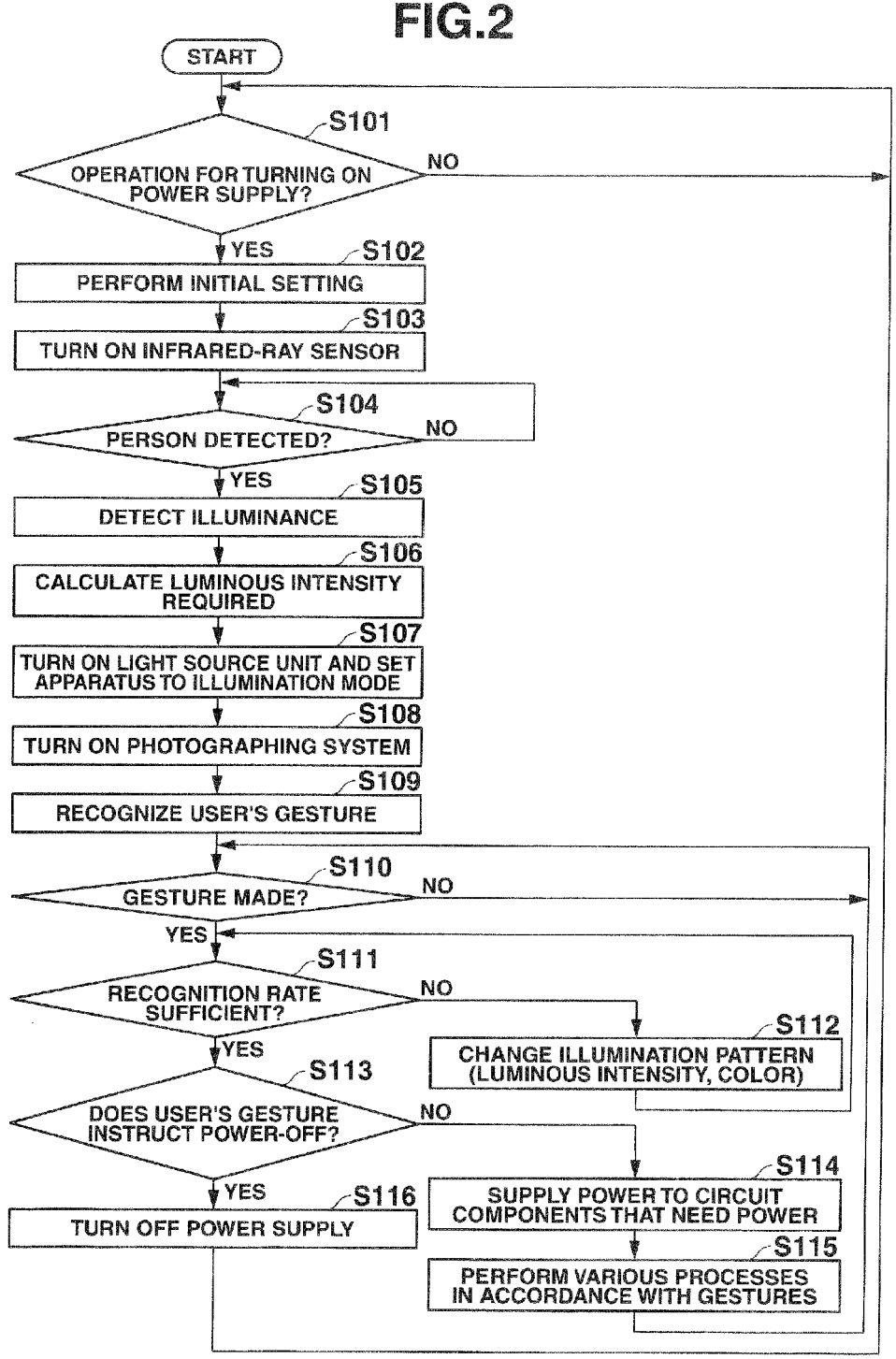

PROJECTION APPARATUS, PROJECTION CONTROL METHOD AND STORAGE MEDIUM STORING PROGRAM

CROSS-REFERENCE TO RELATED APPLICATIONS

This application is based upon and claims the benefit of priority from prior Japanese Patent Application No. 2011-207566, filed Sep. 22, 2011, the entire contents of which are incorporated herein by reference.

BACKGROUND OF THE INVENTION

1. Field of the Invention

The present invention relates to a projection apparatus, a projection control method, and a storage medium storing a program, suitable for use as, for example, a projector that uses semiconductor light-emitting elements as light source.

2. Description of the Related Art

Hitherto, a technique has been proposed, which enables a user to set the various functions of a projector though remote control, by placing his or her hand in a specific area, without using a remote controller or a pointing device, and to recognize the user's gesture (refer to, for example, Jpn. Pat. Appln. KOKAI Publication No. 2005-141151.)

The publication identified above discloses the technique of comparing the guidance image projected by a projector and showing the area at which the user has placed his or her hand, with the contents of the image photographed of the area, thereby to determine the manipulation the user is performing.

Therefore, the user cannot perform manipulations including those performed on the projector before the start of projecting images, if the reference image for comparison has not been projected. That is, the manipulation items the user may perform are limited in number.

Further, the technique has not bee devised in consideration of the illumination necessary for achieving desirable gesture recognition. In view of the precision of gesture recognition, it is undesirable to recognize the user's gesture in the dark.

Under the circumstances, it is desired to provide a projection apparatus, a projection control method and a storage medium storing a program, capable of reliably performing remote control in accordance with the user's gesture.

BRIEF SUMMARY OF THE INVENTION

According to one aspect of the present invention, there is provided a projector apparatus comprising: a light source; a projection unit configured to form an optical image by using light emitted from the light source and to project the formed image; an input unit configured to input a video signal representing the image to be projected by the projection unit; a person detection unit configured to detect a person existing in a projection area of the projection unit; a first projection control unit configured to set the projector apparatus to a projection state using a preset illumination pattern, when the person detection unit has detected a person in the projection area; a motion analyzing unit configured to analyze a person's motion in the projection area; and a second projection control unit configured to activate the motion analyzing unit, after the first projection control has set the projector apparatus to the projection state using the preset illumination pattern.

According to another aspect of the present invention, there is provided a projection control method for use in a projector apparatus including a light source, a projection unit configured to form an optical image by using light emitted from the light source and to project the formed image, and an input unit configured put a video signal representing the image to be projected by the projection unit, the method comprising: performing a person detection process of detecting a person existing in a projection area of the projection unit; performing a first projection control process of setting the projector apparatus to a projection state using a preset illumination pattern, when a person is detected in the person detection process; and performing a second projection control process of setting the projector apparatus to a motion analyzing step of analyzing the person's motion in the projection area, after the projector apparatus has been set, in the first projection control process, to the projection state using the preset illumination pattern in the first projection control process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart showing the sequence of the projection according to the embodiment.

DETAILED DESCRIPTION OF THE INVENTION

Figure 1:
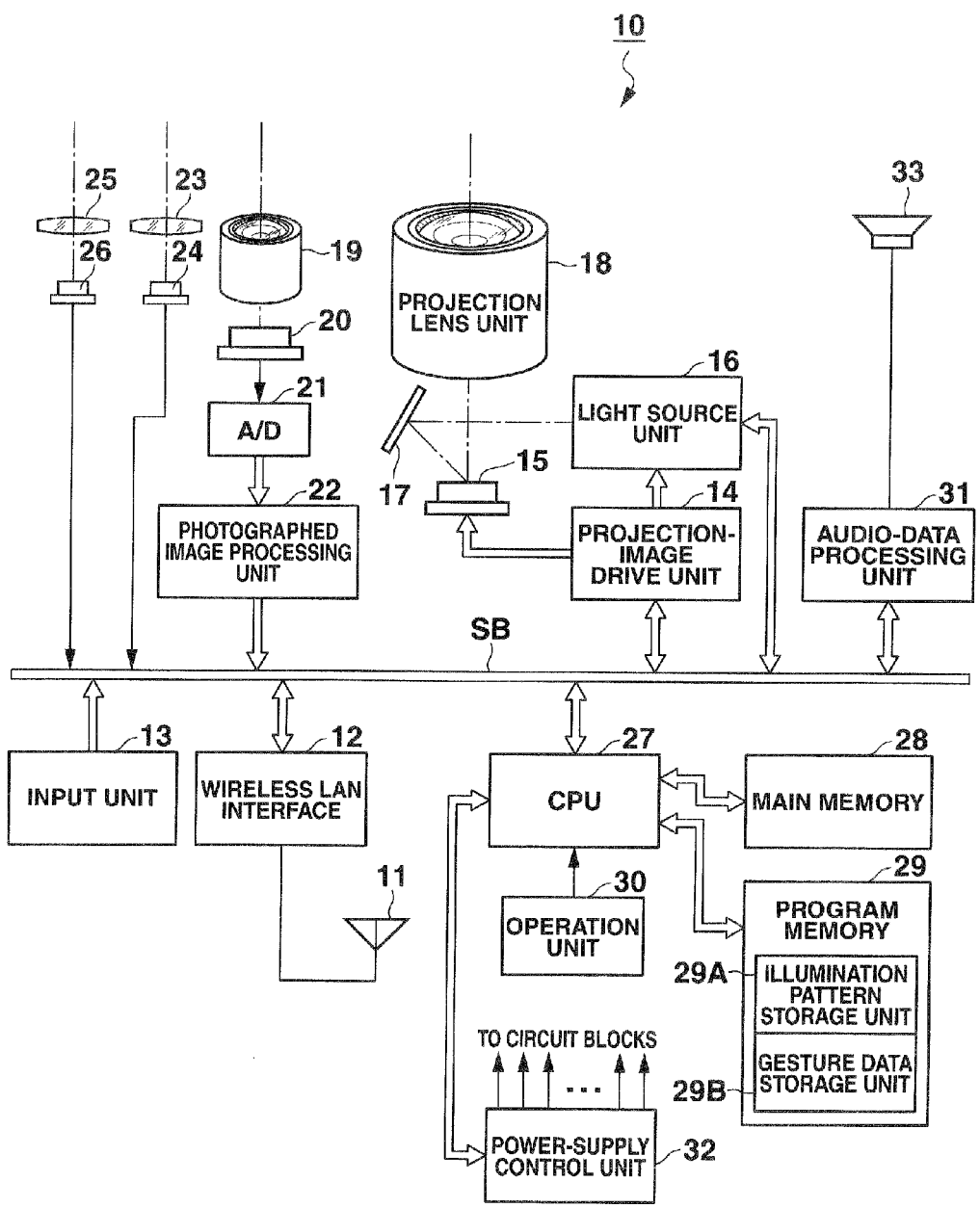
FIG. 1 is a block diagram showing the function circuit configuration of an illumination projector according to an embodiment of the present invention.

An embodiment of the present invention, or an illumination projector (i.e., projector having illumination function) of on-ceiling type, which adopts the Digital Light Processing (DLP [registered trademark]) system, will be described with reference to the accompanying drawings.

The illumination projector according to the embodiment is mounted on the ceiling and used as a down light, and can yet project an image on, for example, a table set right below the projector. The top plate of the table therefore serves as a screen.

The illumination projector according to the embodiment includes a zoom lens in the projection lens system. In the illumination mode, the illumination projector applies light at a wide projection angle of, for example, 120°, illuminating the room. In the image projection mode, the illumination projector can project an image at a narrow projection angle of about 45°, thereby concentrating the light flux and increasing the image brightness.

FIG. 1 is a diagram showing mainly the function circuit configuration of the illumination projector 10 according to the embodiment.

As shown in FIG. 1, a video signal is input by radio from a wireless LAN antenna 11 via a wireless LAN interface 12, and a video signal is input from an external apparatus (not shown) via an input unit 13 connected by a wire to the external apparatus.

The wireless LAN interface 12 is an interface circuit that accords with, for example, the IEEE 802.11a/b/g/n Wi-Fi standard. When controlled by a CPU 27 (described later), the wireless LAN interface 12 controls the data transfer between the wireless LAN antenna 11 and the external apparatus, for example, personal computer.

The input unit 13 has, for example, a video input terminal of the pin jack (RCA) type, an RGB input terminal of the D-sub 15 type, a video/audio input terminal of the High-Definition Multimedia interface (HDMI) standard, and a Universal Serial Bus (USB) connector.

A video signal and an audio signal are input through some of these terminals from the external apparatus wire-connected to these terminals.

The video signal of any one of various standards, input at the wireless LAN interface 12 or the input unit 13 is first digitized and then sent to a projection-image drive unit 14 through a system bus SB. The projection-image drive unit 14 drives micromirror elements 15 in accordance with the video data supplied to it, by means of high-speed time division driving that accords with the product of a frame rate (for example, 60 frames/second), the divider of each color component and the number display gradations.

The micromirror elements 15 are arranged, forming a WXGA matrix (for example, 1280 horizontal pixels×768 vertical pixels). They are driven on and off at high speed, each inclined by a specific angle and reflecting a light beam. The light beams reflected by the micromirror elements 15 form an optical image.

The light source unit 16 cyclically emits three primary-color beams red, green and blue in time division.

The light source unit 16 has LEDs. The LEDs are semiconductor light-emitting elements and repeatedly emit the primary-color beams red, green and blur, respectively.

Here, the term "LED" is used in a broad sense. The LEDs the light source unit 16 has may be semiconductor lasers (LDs) or organic electroluminescent elements.

The primary-color beams emitted from the light source unit 16 are totally reflected at a mirror 17 and applied to the micromirror elements 15.

At the micromirror elements 15, the beams form an optical image. The optical image is projected through a projection lens unit 18 onto the top plate of the table, and is displayed thereon.

The projection lens unit 18 contains a lens optical system. The lens optical system includes a focus lens and a zoom lens. The focus lens is configured to move the focal point. The zoom lens is configured to change the zoom (projection) view angle.

According to the embodiment, the projection-image drive unit 14, the micromirror elements 15, the mirror 17, and the projection lens unit 18 function together as a projection unit.

Adjacent to the projection lens unit 18, a photographing lens unit 19 is arranged.

The photographing lens unit 19 has a photographing view angle covering the wide projection view angle of the projection lens unit 18.

The light applied to the photographing lens unit 19 forms an optical image on a CMOS image sensor 20 which is a solid-state imaging element.

The image sensor generates a video signal from the optical image. The video signal is digitized at an analog-to-digital converter 21, which outputs a digital video signal. The digital video signal is sent to a photographed image processing unit 22.

The photographed image processing unit 22 processes the time-serial video data the CMOS image sensor 20 has generated by continuously scanning the optical image. The photographed image processing unit 22 thereby extracts the edges of the image and detects the motion of the image, and ultimately extracts the motion of a person photographed in the image, as will be explained later.

In the vicinity of the projection lens unit 18 and photographing lens unit 19, an infrared-ray sensor 24 and an illuminance sensor 26 are provided. Lenses 23 and 25 are arranged in front of the infrared-ray sensor 24 and the illuminance sensor 26, respectively.

The infrared sensor 24 is provided as a person detection sensor. It detects the infrared rays emanating from any person who exists in the widest-angle projection area of the projection lens unit 18.

The result of detection is converted to digital data, which is output to the CPU 27.

The illuminance sensor 26 detects the average illuminance in the widest-angle projection area of the projection lens unit 18, and digitizes the average illuminance, generating digital data. The digital data thus generated is output to the CPU 27.

The CPU 27 controls all circuit components incorporated in the illumination projector 10.

The CPU 27 is connected directly to the main memory 28 and the program memory 29.

The main memory 28 is constituted by, for example, an SRAM, and functions as work memory for the CPU 27.

The program memory 29 is an electrically programmable nonvolatile memory such as a flash ROM, and stores the operating program the CPU 27 executes, and also various fixed data, etc.

As shown in FIG. 1, the program memory 29 includes an illumination pattern storage unit 29A and a gesture data storage unit 29B.

The illumination pattern storage unit 29A stores video data (representing an illumination image) projected in the illumination mode, and also parameter data (i.e., brightness, etc.) projected also in the illumination mode.

The gesture data storage unit 29B stores the data representing the time-sequential motion vector of the user's gesture that has been recorded.

The CPU 27 reads the operating program and fixed data stored in the program memory 29 and extends the program and fixed data in the main memory 28. Then, the CPU 27 executes the program, controlling all circuit components incorporated in the illumination projector 10.

The CPU 27 performs various steps of projecting an image, in accordance with the signals supplied from an operation unit 30.

The operation unit 30 receives key signals sent from a remote controller (not shown) dedicated to the illumination projector 10, through the infrared-ray emitting unit provided in the main unit of the illumination projector 10. The operation unit 30 then supplies the key signals to the CPU 27.

The CPU 27 is connected by the system bus SB to an audio-data processing unit 31 and is connected directly to a power-supply control unit 32.

The audio-data processing unit 31 includes a sound source circuit such as a PCM sound source, and converts the audio signal it receives in the process of projecting an image, to an analog audio signal. The analog audio signal is supplied to a speaker unit 33. Driven by the analog audio signal, the speaker unit 33 generates sound or a beep.

Under the control of the CPU 27, the power-supply control unit 32 supplies power to the circuit blocks constituting the illumination projector 10.

How the embodiment described above will be explained blow.

The following explanation is based on the assumption that the embodiment starts operating after the CPU 27 has read the operating program and fixed data from the program memory 29 and extended them in the main memory 28 as described above.

The operating program stored in the program memory 29 includes not only the program stored when the illumination projector 10 was shipped from the factory, but also the programs installed by using a software update downloaded from, for example, a personal computer (not shown) via the Internet, antenna 11 and wireless LAN interface 12, after the user has bought the illumination projector 10.

FIG. 2 shows the sequence of the basic operation the CPU 27 performs. At first, the CPU 27 waits for a key signal coming from the remote controller. That is, the CPU 27 determines whether the remote controller has output a key signal which has caused the operation unit 30 to turn on the power supply (Step S101).

At this time, the CPU 27 causes the power-supply control unit 32 to supply no power to all circuits connected to the system bus SB, but to the circuits directly connected to the CPU 27.

When the remote controller is operated to turn on the illumination projector 10, the CPU 27 determines this event, and performs the initial setting of the illumination projector 10 (Step S102). Then, the CPU 27 causes the power-supply control unit 32 to start supplying power to the infrared-ray sensor 24 which is as a person detection sensor (Step S103).

Thereafter, the CPU 27 keeps determining whether the detection output of the infrared-ray sensor 24 has reached or exceeded a preset threshold value, until a person is detected in the projection area of the projection lens unit 18 (Step S104).

If a person exits in the widest-angle projection area of the projection lens unit 18 and the detection output of the infrared-ray sensor 24 has therefore reached or exceeded a preset threshold value, the CPU 27 determines this event in Step S104. In this case, the CPU 27 causes the power-supply control unit 32 to supply power to the illuminance sensor 26, which detects the illuminance in the widest-angle projection area of the projection lens unit 18 (Step S105).

Then, the CPU 27 calculates the luminous intensity required in the illumination mode from the illuminance detected in the widest-angle projection area of the projection lens unit 18 (Step 106).

With regard to calculation of this luminous intensity, an algorithm of calculating it is included in the operating program stored in the program memory. This algorithm describes that the widest-angle projection area need not be illuminated if the illuminance detected is high, indicating that the area is bright, and must illuminated if the illuminance detected is low, indicating that the area is rather dark.

The area can be thereby maintained bright in a required timing enough to raise the rate of recognizing the user's gesture, while not wasting power. That is described later.

The CPU 27 causes the power-supply control unit 32 to supply power to the light source unit 16, projection-image drive unit 14 and micromirror elements 15. The illumination projector 10 therefore starts operating in the illumination mode using an illumination pattern based on the luminous intensity calculated. (Step S107).

Next, the CPU 27 causes the power-supply control unit 32 to supply power to the CMOS image sensor 20, analog-to-digital converter 21 and photographed image processing unit 22 which constitute a photographing system. As a result, the objects in the widest-angle projection area of the projection lens unit 18 are photographed at a preset frame rate (for example, 10 frames/second) (Step S108).

The CPU 27 further causes the photographed image processing unit 22 to start an image processing including the extraction of the edge data from the time-serial video data and the motion detection between the images, thereby recognizing the user's gesture. (Step S109).

The CPU 27 repeatedly determines whether the photographed image processing unit 22 has generated data which represents the motion of a person, thereby to determine whether the person has made a gesture. Thus, the CPU 27 waits for any gesture the user may make to give instructions (Step S110).

On receiving the data representing the motion of the person, from the photographed image processing unit 22, the CPU 27 determines that the person has made a gesture (Step S110: Yes).

Next, the CPU 27 compares the data sequentially acquired from the photographed image processing unit 22 and representing the motion of the user, with the gesture data stored in the gesture data storage unit 29B of the program memory 29 and representing various preset projection operations. The CPU 27 thereby determines the similarity between the motion represented by each data thus acquired and the motion represented by each gesture data stored in the gesture data storage unit 29B, thereby calculating the rate of recognizing the user's gesture.

Further, the CPU 27 determines whether the rate of recognizing the user's gesture exceeds, for example, 80%. That is, the CPU 27 determines whether the rate is sufficiently high or not (Step S111).

If the rate of recognizing the user's gesture is not sufficiently high, the CPU 27 changes the illumination pattern (Step S112). More precisely, the CPU 27 changes the preset illumination pattern, that is, causing the light source unit 16 to emit more light step by step, changing the primary-color gradation balance at the micromirror elements 15, or switching the illumination color among various colors (for example, white, incandescent color, red, blue and green) by turning on and off the semiconductor light-emitting elements, or by changing the stop position of the color wheel or the like. Then, the CPU 27 returns to Step S111.

Thus, the CPU 27 repeatedly performs the process of Step S112 as long as the rate of recognizing the user's gesture is not sufficiently high. That is, the illumination pattern is changed over again, preventing the rate of recognizing the user's gesture from decreasing because of the color and luminous intensity of the user's clothing. As a result, the rate of recognizing the user's gesture can be increased.

In Step S111, the CPU 27 may determine that the rate of recognizing the user's gesture has become high enough. In this case, the CPU 27 determines whether the user's gesture instructs that the illumination projector 10 should be turned off or not (Step S113).

If the user's gesture instructs is determined not to turn off the illumination projector 10, the CPU 27 causes the power-supply control unit 32 to start supplying power to the circuit components that need power (Step S114).

Further, the CPU 27 performs various processes in accordance with the user's gestures, such as switching the illumination mode to the image projection mode, switching the system for inputting the video signal in the photography mode, page forwarding, page rewarding, and increasing/decreasing the luminous intensity or sound volume (Step S115). Then, the CPU 27 returns to the process of Step 110.

In Step S113, the user's gesture may be found to instruct that the power switch of the illumination projector 10 be turned off. In this case, the CPU 27 causes the power-supply control unit 32 to supply no power to all circuits, but to the circuits that serve to determine whether a power-on signal has been input, in accordance with the instruction made at the remote control (Step S116). The CPU 27 then returns to the process of Step S101.

As has been described in detail, this embodiment can achieve a reliable remote control even in the illumination mode, in accordance with the motion of the user, no matter whether an image is actually being projected or not.

In addition, the embodiment can prevent a waste of power even in the waiting state, because the CPU 27 controls the power-supply control unit 32, causing the same to supply power to only the circuits that need power.

Moreover, in the embodiment, the illumination pattern in the illumination mode is gradually changed in terms of luminous intensity and color, as needed, in accordance with the rate of recognizing the user's gesture. This can enhance the rate of recognizing the user's gesture even more in accordance with the luminous intensity and color of the user's clothing.

The illumination pattern is changed in accordance with the illuminance in the embodiment described above. This can enhance the accuracy of recognizing the instruction from the user's gesture.

Further, the embodiment described above has a storage means storing a plurality of illumination patterns. The illumination pattern can therefore easily switched, from one to another.

Moreover, various instructions for projecting images can be made as the user makes gestures in the embodiment described above. Hence, even if the projector is an on-ceiling type as described in the embodiment, the user can instruct the projector by gesture to operate, without using a remote controller, so long as the instructions are concerned with relatively simple operations. Thus, the projector can be more easily manipulated than otherwise.

In the embodiment described above, the infrared-ray sensor 24 is used to detect a person. Whether a person exists in the projection environment can therefore be determined with a relatively simple configuration.

The embodiment described above is applied to an illumination projector of on-ceiling type, which adopts the DLP (trademark) system. Nonetheless, the present invention is not limited in terms of projection type, installation position, light-emitting elements used in the light source, sensors used, and the like.

Further, the embodiment described above uses the rate of recognizing the user's gesture and the detected illuminance, to change the illumination pattern. Alternatively, only the rate of recognizing the user's gesture or only the detected illuminance may be used to change the illumination pattern.

The present invention is not limited to the embodiment described above. The components of any embodiment can be modified in various manners in reducing the invention to practice, without departing from the spirit or scope of the invention.

Further, the functions of any embodiment described above may be combined, if possible, in various ways.

The embodiment described above includes various phases of the invention. The components disclosed herein may be combined as needed to make various inventions.

For example, even if some components of the embodiment described above are not used, the resulting configuration can be considered as the invention so long as it achieves advantages described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector apparatus comprising:
a light source;
a projection unit configured to form an optical image by using light emitted from the light source and to project the formed image;
an input unit configured to input a video signal representing the image to be projected by the projection unit;
a person detection sensor configured to detect a person existing in a projection area of the projection unit; and
a CPU configured to control the projector apparatus;
wherein the CPU is configured to perform functions comprising:
setting the projector apparatus to a projection state using a preset illumination pattern, when the person detection sensor has detected a person in the projection area; and
performing an analysis of a person's motion in the projection area of the projection unit, after the setting the projector apparatus to the projection state using the preset illumination pattern.

2. The projector apparatus according to claim 1, further comprising a power-supply control unit configured to limit a supply of power to some circuits including the input unit, until a preset analysis result is acquired by performing the analysis of the person's motion, after the CPU has set the projector apparatus to the projection state according to the preset illumination pattern.

3. The projector apparatus according to claim 1, wherein the CPU is configured to change the projection state according to the illumination pattern by using the light source and the projection unit, in accordance with a result of the analysis of the person's motion.

4. The projector apparatus according to claim 3, further comprising an illumination pattern storage unit storing a plurality of illumination patterns in which the light source and the projection unit perform illumination,
wherein the CPU selects a specific illumination pattern from among the illumination patterns stored in the illumination pattern storage unit, thereby changing the projection state.

5. The projector apparatus according to claim 1, further comprising:
an illuminance sensor configured to detect illuminance at the projection area of the projection unit,
wherein the CPU is configured to change the projection state using the illumination pattern by using the light source and the projection unit, in accordance with the illuminance detected by the illuminance sensor.

6. The projector apparatus according to claim 5, further comprising an illumination pattern storage unit storing a plurality of illumination patterns in which the light source and the projection unit perform illumination,
wherein the CPU selects a specific illumination pattern from among the illumination patterns stored in the illumination pattern storage unit, thereby changing the projection state.

7. The projector apparatus according to claim 1, wherein the CPU is configured to set the projector apparatus to a next projection state from a currently set projection state using a preset illumination pattern, in accordance with a result of the analysis of the person's motion.

8. The projector apparatus according to claim 1, wherein the person detection sensor comprises an infrared-ray sensor.

9. A projection control method for use in a projector apparatus including a light source, a projection unit configured to form an optical image by using light emitted from the light source and to project the formed image, and an input unit configured to input a video signal representing the image to be projected by the projection unit, the method comprising:

performing a person detection process of detecting a person existing in a projection area of the projection unit;

performing a first projection control process of setting the projector apparatus to a projection state using a preset illumination pattern, when a person is detected in the person detection process; and performing a second projection control process of setting the projector apparatus to a motion analyzing step of analyzing the person's motion in the projection area, after the projector apparatus has been set, in the first projection control process, to the projection state using the preset illumination pattern in the first projection control process.

10. A non-transitory computer-readable storage medium having a program stored thereon for controlling a CPU of a projector apparatus, the projector apparatus including (i) a light source, (ii) a projection unit configured to form an optical image by using light emitted from the light source and to project the formed image, (iii) an input unit configured to input a video signal representing the image to be projected by the projection unit, (iv) a person detection sensor configured to detect a person existing in a projection area of the projection unit, and (v) the CPU which is configured to control the projector apparatus, and the program being executable by the CPU to execute functions comprising:

setting the projector apparatus to a projection state using a preset illumination pattern, when the person detection sensor has detected a person in the projection area; and analyzing a person's motion in the projection area of the projection unit, after the setting to the projection state using the preset illumination pattern.

\* \* \* \* \*